J. B. CLEAVELAND.

FENCE.

No. 11,045. Reissued Dec. 3, 1889.

WITNESSES.

Gustav Bohn.

E. B. Griffith.

INVENTOR.

John B. Cleaveland.

By C. F. Jacobs

Atty.

UNITED STATES PATENT OFFICE.

JOHN B. CLEAVELAND, OF INDIANAPOLIS, INDIANA.

FENCE.

SPECIFICATION forming part of Reissued Letters Patent No. 11,045, dated December 3, 1886

Original No. 392,948, dated November 13, 1888. Application for reissue filed July 25, 1886. Serial No. 318,684.

*To all whom it may concern:*

Be it known that I, JOHN B. CLEAVELAND, of Indianapolis, county of Marion, and State of Indiana, have invented certain new and useful Improvements in Fences; and I do hereby declare that the following is a full, clear, and exact description of the same, reference being had to the accompanying drawings, in which like letters refer to like parts.

This invention relates to the construction of fences composed of metal posts connected by one or more rods or tubes and a series of wires extending from post to post, which shall be cheap, durable, and ornamental, and one that may be quickly set up and adjusted.

Heretofore in the manufacture of fences of this class, having horizontal bars or pipes extending from post to post, one or more sides of the joints have been formed by screwing the end of the pipe or rod into a coupling or union, locking the fence together in this manner; but this construction makes the framework of the fence rigid, incapable of easy adjustment or removal, requires considerable labor and effort to set up, and to some extent interferes with the practicability of extending the barbed strands of wire above the bar or pipe, thus in a measure depriving the fence of its merits as a safeguard against trespass and intrusion.

One object of my invention is to so support the pipes, posts, and their connections that one or a series of pipes may be quickly secured to the posts and readily adjusted to any desired position thereon, whereby the strands or series of strands or barbed or other wire may be stretched above such pipe or pipes.

Another object of my invention is to make the connection between the pipe and posts in such manner that the joints shall be easily and readily formed and held firmly in place by the tension of the wires that stretch from post to post.

Figure 1:
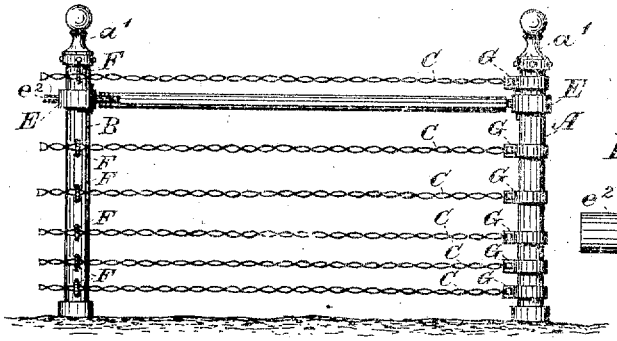
Figure 2:
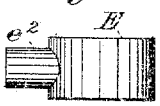
Figure 3:
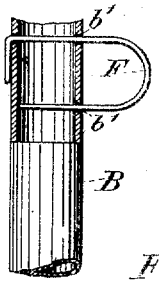
Figure 4:
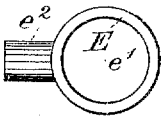
Figure 5:
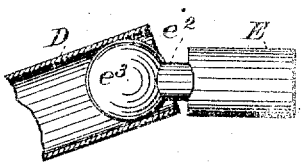
Figure 6:
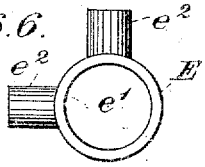

In the drawings, Figure 1 represents a front view of a single panel of fence as constructed on my plan, showing one corner-post or gate-post and one intermediate or line post. Fig. 2 is an enlarged detail side elevation of one of the ring-clips provided with dowel-pins for entering the opening in the end of the pipe and supporting the same. Fig. 3 is an enlarged sectional detail of one of the line-posts, showing the manner in which the staples or eyes that encircle the wires of the fence are secured thereto. Fig. 4 is a plan view of one of the pipe-holding clips, in which the dowel-pin or pipe-holding projection is straight. Fig. 5 is a modified form of the same, the dowel-pin being provided with a ball end for forming a joint in the pipe-socket. Fig. 6 is a plan view of a clip having two projecting lugs or dowel-pins extended out at right angles and intended to be used with a corner-post.

In the drawings, A represents the corner-post, which may be made either solid or of ordinary iron pipe. B is the intermediate line-post; C, the strands of wire; D, the pipe-tube which connects the posts, and E the clip which supports the pipe and adjustably secures it to the posts A.

The corner-posts are preferably made of greater diameter than the line-posts, and both are provided with suitable caps or ornaments $a'$ at the upper end.

As will be understood by reference to Fig. 3 of the drawings, the line-post B has a series of perforations $b'$, arranged in pairs, each pair being a suitable distance apart, and it will also be noticed that the lower one of each pair of perforations extends through but one side of the hollow post, while the upper perforation extends entirely through the post. Inserted into each pair of the perforations are the prongs of a U-shaped staple F, the lower prong of which is shorter than the upper and extends into the lower perforation of the pair to which it belongs, while the upper and longer prong thereof extends entirely through the post in the upper perforation, and its end is turned over or clinched against the post, the U end of the staple projecting out far enough to allow a wire to be passed through it.

The object of having but one perforation of the pair extend entirely through the post and having one shorter than the other is that in setting the staples the end of the short prong will abut against the opposite inner wall of the post, which will not only gage the distance the U end will project, but permit pressure to be put upon such end, holding the staple firmly while turning over or clinching the protruding end of the longer prong, which is a great advantage, as it insures uniformity of distance of projection and saves time in setting the staples.

The wires C of the fence are secured to the corner-posts by clips G or other similar devices, and are extended through the staples upon the line-posts, these wires preferably being made of twisted sheet-steel, or what is known as "steel ribbon" or "buckthorn wire." I do not desire, however, to limit myself to any particular form of fence-wire, as any kind may be used.

The pipe or tube D is preferably secured to the posts A B by the clips E, which have eyes $e'$ encircling the posts, and one or more outwardly-projecting circular lugs or pins $e^2$, which enter the open end or ends of the pipe and support it, and when these clips have been adjusted upon the posts to the desired position they may be secured thereto by keys or other similar devices, as shown in Fig. 1 of the drawings. When connected to the posts of a fence intended to be set up at an angle to accommodate it to different grades, the dowel pins or lugs $e^2$ will be provided with a rounded head $e^3$, to enter the end of the pipe or tube and permit said pipe to be inclined more or less, so as to correspond with the grade of the ground upon which the fence is set, as shown in Fig. 5, such construction forming a good support for the pipes and allowing it to be adjusted at different angles without inconvenience.

Instead of securing the adjustable clip E to the post by a key, a set-screw or other common device may be used for that purpose.

I am aware that fences have been constructed of pipes and sockets adapted to screw together at the joints, and this construction I do not claim, as my joint is formed in an entirely different manner, and the joints are closed up and held together by the tension of the wires, as herein shown.

What I claim as my invention, and desire to secure by Letters Patent, is the following:

1. A wire and-metal tube fence comprising metal posts, dowels or lugs connected thereto, and one or more tubes extending from post to post, their open ends loosely inclosing such dowels or lugs, in combination with wires connected to and stretched upon such posts by suitable mechanism, whereby the joints of the tubes at the posts are held together by the tension of the wires, substantially as described.

2. In a wire and metal-tube fence, the combination of a series of posts connected near their upper ends by tubes, dowels or lugs formed integral with or connected to such posts and adapted to freely enter the tube-openings, a series of wires connected to and stretched upon such posts by suitable mechanism, whereby the joints formed by the dowels entering the tube-sockets are closed by the tension of the stretched wires, substantially as shown and described.

3. The combination, in a wire and metal-tube fence, of the tubular posts A B, wires C, connected therewith, the cast or wrought metal clips E, having the eyes $e'$ to engage the posts, and the solid right-angle lugs $e^2$, formed integral therewith, having smooth unthreaded peripheries and being in diameter slightly less than the interior diameter of the tubes D, said clips being keyed to the posts, and the tubes or pipes D, having smooth unthreaded interior ends loosely encircling the lugs $e^2$ of the clips E, all substantially as shown, and for the purpose described.

4. In a fence, the combination, with the post, of a metallic ring adjustably secured to the post and having right-angle projections with enlarged spherically-shaped ends to enter the ends of pipes or tubes, which are removably connected therewith, substantially as and for the purpose set forth.

5. In a wire fence, the hollow post B, having perforations $b'$ therein arranged in pairs, one perforation of each pair extending entirely through the post and one perforation extending through only one wall of said post, in combination with the staple F, one prong of which is long and extends entirely through the post and is clinched upon the opposite side, and one prong of which is short and extends into said post and abuts at its end against the opposite inner wall, substantially as and for the purpose described.

In witness whereof I have hereunto set my hand this 10th day of July, 1889.

JOHN B. CLEAVELAND.

Witnesses:

C. P. JACOBS,

E. B. GRIFFITH.